(12) United States Patent
Chou et al.

(10) Patent No.: US 12,272,077 B2
(45) Date of Patent: Apr. 8, 2025

(54) TRACKING PERFORMANCE EVALUATION METHOD AND HOST

(71) Applicant: HTC Corporation, Taoyuan (TW)

(72) Inventors: Nien Hsin Chou, Taoyuan (TW); Wen Ting Lo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 179 days.

(21) Appl. No.: 18/149,168

(22) Filed: Jan. 3, 2023

(65) Prior Publication Data

US 2023/0215021 A1 Jul. 6, 2023

Related U.S. Application Data

(60) Provisional application No. 63/296,799, filed on Jan. 5, 2022.

(51) Int. Cl.
G06T 7/246 (2017.01)
G06T 17/00 (2006.01)
G06T 19/20 (2011.01)

(52) U.S. Cl.
CPC .............. G06T 7/246 (2017.01); G06T 17/00 (2013.01); G06T 19/20 (2013.01); G06T 2210/04 (2013.01)

(58) Field of Classification Search
None
See application file for complete search history.

(56) References Cited

U.S. PATENT DOCUMENTS

| 2020/0134927 | A1* | 4/2020 | Huang | G02B 30/22 |
| 2021/0216135 | A1 | 7/2021 | Connellan et al. | |
| 2021/0312684 | A1 | 10/2021 | Zimmermann et al. | |
| 2023/0237696 | A1* | 7/2023 | Inoue | G06T 5/50 |
| | | | | 345/633 |

FOREIGN PATENT DOCUMENTS

| TW | 202101976 | | 1/2021 |
| TW | 202127104 | | 7/2021 |
| WO | WO-2021075318 | A1 * | 4/2021 |

OTHER PUBLICATIONS

"Office Action of Taiwan Counterpart Application", issued on Feb. 19, 2024, p. 1-p. 11.

* cited by examiner

Primary Examiner — Aaron M Richer
(74) Attorney, Agent, or Firm — JCIPRNET

(57) ABSTRACT

Embodiments of the invention provide a tracking performance evaluation method and a host. The method includes: establishing a virtual environment; obtaining a tracking result of a virtual tracking device executing a tracking function in the virtual environment; and providing a tracking performance evaluation result for the virtual environment based on the tracking result.

16 Claims, 2 Drawing Sheets

TRACKING PERFORMANCE EVALUATION METHOD AND HOST

CROSS-REFERENCE TO RELATED APPLICATION

This application claims the priority benefit of U.S. provisional application Ser. No. 63/296,799, filed on Jan. 5, 2022. The entirety of the above-mentioned patent application is hereby incorporated by reference herein and made a part of this specification.

BACKGROUND

Technical Field

The invention relates to an environmental evaluation technology, and particularly relates to a tracking performance evaluation method and a host.

Description of Related Art

When performing inside out tracking functions such as simultaneous localization and mapping (SLAM), the relevant tracking performance depends largely on the environment where the tracking device (such as a head-mounted display (HMD) running a virtual reality (VR) service) is located.

Generally speaking, for an environment/area (such as a white wall) with a relatively simple arrangement manner, the tracking device may not be able to find a sufficient number of feature points in such an environment/area, resulting in a poor tracking performance. On the contrary, for an environment/area determined as having more feature points, the tracking device may achieve a good tracking performance.

Generally speaking, most of the time, the tracking device is actually used to perform SLAM until after the relevant arrangement of an environment has been completed. In this case, if the tracking effect of SLAM is not good, it may be necessary to re-adjust the furnishings and the arrangement of the environment, thereby incurring other costs or manpower consumption. Moreover, for an environment with a larger venue and/or an arrangement that is difficult to be changed, the difficulty of adjusting the environment is further increased.

SUMMARY

In view of this, the invention provides a tracking performance evaluation method and a host, which can be used to solve the above technical problems.

An embodiment of the invention provides a tracking performance evaluation method, suitable for a host, including: establishing a virtual environment; obtaining a tracking result of a virtual tracking device executing a tracking function in the virtual environment; and providing a tracking performance evaluation result for the virtual environment based on the tracking result.

An embodiment of the invention provides a host, including a storage circuit and a processor. The storage circuit stores a program code. The processor is coupled to the storage circuit and accesses the program code to execute: establishing a virtual environment; obtaining a tracking result of a virtual tracking device executing a tracking function in the virtual environment; and providing a tracking performance evaluation result for the virtual environment based on the tracking result.

DESCRIPTION OF THE EMBODIMENTS

Figure 1:
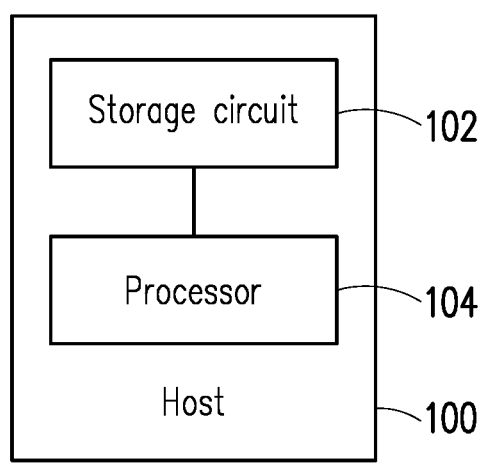
FIG. 1 is a schematic diagram of a host according to an embodiment of the invention.

Please refer to FIG. 1, which is a schematic diagram of a host according to an embodiment of the invention. In different embodiments, a host 100 may be implemented as various smart devices and/or computer devices, but is not limited thereto.

In FIG. 1, the host 100 includes a storage circuit 102 and a processor 104. The storage circuit 102 is, for example, any type of fixed or removable random access memory (RAM), read-only memory (ROM), flash memory, hard disk, other similar devices, or a combination of these devices and may be used to record multiple program codes or modules.

The processor 104 is coupled to the storage circuit 102 and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kind of integrated circuits, state machines, processors based on advanced RISC machine (ARM), and the like.

In an embodiment of the invention, the processor 104 may access the modules and program codes recorded in the storage circuit 102 to implement a tracking performance evaluation method proposed by the invention, and the details of which are described below.

Figure 2:
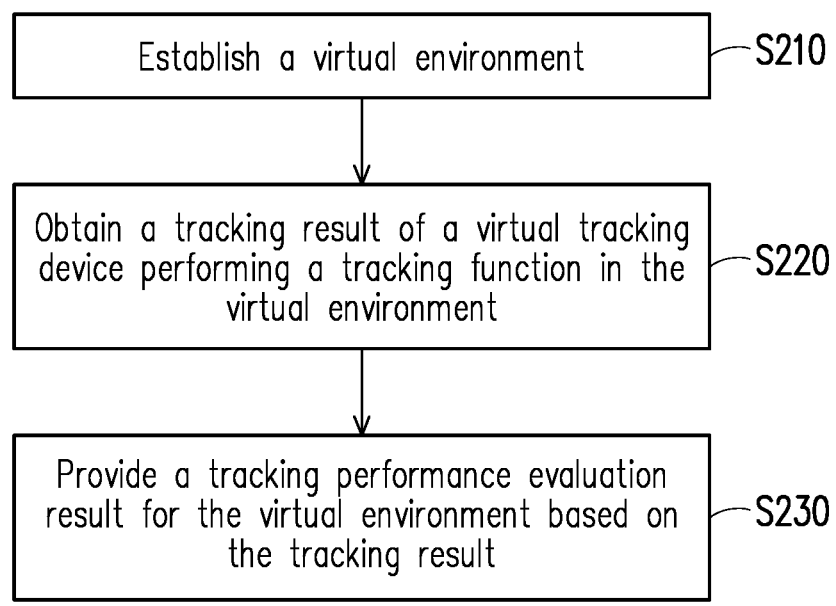
FIG. 2 is a flowchart of a tracking performance evaluation method according to an embodiment of the invention.

Please refer to FIG. 2, which is a flowchart of the tracking performance evaluation method according to an embodiment of the invention. The method of this embodiment may be executed by the host 100 in FIG. 1, and the details of each Step in FIG. 2 will be described below with the components shown in FIG. 1.

First, in Step S210, the processor 104 establishes a virtual environment. In an embodiment, the virtual environment may be established according to an actual environment, wherein the actual environment is, for example, an environment (such as a certain actual location and/or area) where the tracking device performs an inside out tracking function (such as SLAM) in the future, but is not limited thereto.

In an embodiment, the processor 104 may obtain, for example, a 3D model established by scanning the actual environment, and use the 3D model as the virtual environment. In an embodiment, the processor 104 may further edit the virtual environment in response to the control of a designer. For example, the processor 104 may add devices and/or furnishings not present in the actual environment to the virtual environment in response to the requirements of the designer, but is not limited thereto.

Under this circumstance, the designer may, for example, adjust the virtual environment to an appearance expected to be used for other tracking devices to perform SLAM therein according to requirements.

For example, assuming that the actual environment is an actual living room space with only a small amount of furniture (or no furniture), the 3D model obtained by scanning is, for example, a living room space model with a small amount of furniture (or no furniture). Under this circumstance, the designer may add other furnishings (such as a couch and a cabinet) and/or decorations not present in the actual living room space to the living room space model through a relevant 3D model editing software, but is not limited thereto.

For another example, assuming that the actual environment is an actual exhibition/performance space with only a few exhibits (or no exhibits), the 3D model obtained by scanning is, for example, an exhibition/performance space model with only a few exhibits (or no exhibits). Under this circumstance, the designer may add other furnishings (such as other booths and exhibits) and/or decorations not present in the actual exhibition/performance space to the exhibition/performance space model through a relevant 3D model editing software, but is not limited thereto.

Next, in Step S220, the processor 104 obtains a tracking result of the virtual tracking device executing the tracking function in the virtual environment. In an embodiment, the virtual tracking device may, for example, correspond to a tracking device, such as a virtual HMD, expected to perform the inside out tracking function in the actual environment in the future, but is not limited thereto.

In an embodiment, the virtual tracking device may be designed to execute the tracking function (such as SLAM) in the virtual environment and provide a corresponding tracking result. In an embodiment, the virtual tracking device may move around in the virtual environment, perform SLAM to each virtual environment area (which includes, for example, furnishings and/or decorations not present in the actual space) in the virtual environment, and provide the tracking result corresponding to each virtual environment area. In some embodiments, the tracking result includes a feature point state corresponding to each virtual environment area, but is not limited thereto.

Afterward, in Step S230, the processor 104 provides a tracking performance evaluation result for the virtual environment based on the tracking result.

In a first embodiment, the feature point state of each virtual environment area may include a feature point quantity. Under this circumstance, for any one (hereinafter referred to as a first virtual environment area) of the virtual environment areas, the processor 104 may determine whether the feature point quantity of the first virtual environment area is lower than a quantity threshold.

In the first embodiment, the quantity threshold is, for example, a feature point quantity value sufficient to achieve a good tracking effect and may be determined by the designer according to requirements, but is not limited thereto.

In the first embodiment, in response to determining that the feature point quantity of the first virtual environment area is lower than the quantity threshold, it means that the virtual tracking device may not be able to find enough feature points in the first virtual environment area, such that a good tracking performance cannot be implemented. Based on this, the processor 104 may determine that the tracking performance of the first virtual environment area is a first state (e.g., not good).

On the other hand, in response to determining that the feature point quantity of the first virtual environment area is not lower than the quantity threshold, it means that the virtual tracking device may find enough feature points in the first virtual environment area, such that a good tracking performance is implemented. Based on this, the processor 104 may determine that the tracking performance of the first virtual environment area is a second state (e.g., good).

From another point of view, the virtual tracking device may be understood as being used to simulate the tracking performances that other tracking devices may achieve in the actual environment when the actual environment is arranged corresponding to the appearance of the virtual environment.

Based on this, if the tracking performance of the first virtual environment area is determined to be the second state, it means that if a corresponding first actual environment area in the actual environment is arranged corresponding to the appearance of the first virtual environment area, other tracking devices may obtain good tracking performances therein.

On the other hand, if the tracking performance of the first virtual environment area is determined to be the first state, it means that if the corresponding first actual environment area in the actual environment is arranged corresponding to the appearance of the first virtual environment area, other tracking devices are unable to obtain good tracking performances. Based on this, the designer may further edit the furnishings/decorations of the first virtual environment area in order to try to improve the tracking performance that the virtual tracking device can achieve therein.

If the adjusted furnishings/decorations of the first virtual environment area enables the virtual tracking device to achieve a good tracking performance therein, it means that if the corresponding first actual environment area in the actual environment is arranged corresponding to the adjusted appearance of the first virtual environment area, other tracking devices may obtain good tracking performances therein.

It may be seen that the method of the embodiment of the invention may know whether the arrangement manner of the virtual environment enables the tracking device to achieve a good tracking performance in the corresponding actual environment through simulation.

In other embodiments, the feature point state may also include other aspects.

In a second embodiment, the feature point state of each virtual environment area includes, for example, a feature point distribution. Under this circumstance, the processor 104 may determine whether the feature point distribution of the first virtual environment area satisfies a preset distribution condition. If yes, the processor 104 may determine that the tracking performance of the first virtual environment area is the second state; otherwise, the processor 104 may determine that the tracking performance of the first virtual environment area is the first state.

In the second embodiment, the preset distribution condition is, for example, a feature point distribution situation sufficient to achieve a good tracking effect and may be determined by the designer according to requirements, but is not limited thereto.

In an embodiment, the processor 104 may determine whether the feature point distribution of the first virtual environment area indicates that a feature point density corresponding to the first virtual environment area is higher than a density threshold. If yes, the processor 104 may determine that the feature point distribution of the first virtual environment area satisfies the preset distribution condition; otherwise, the processor 104 may determine that the feature point distribution of the first virtual environment area does not satisfy the preset distribution condition, but is not limited thereto.

In the second embodiment, the density threshold is, for example, a feature point distribution density sufficient to achieve a good tracking effect and may be determined by the designer according to requirements, but is not limited thereto.

In an embodiment, the processor 104 may also present the feature point distribution corresponding to each virtual environment area in a visual way for the reference of a user. Under this circumstance, the user may correspondingly observe the feature point distribution in the virtual environment area corresponding to each viewing angle when moving the viewing angle of the virtual tracking device in the virtual environment. Based on this, the user may know which virtual environment area may need to add furnishings and/or decorations due to fewer and/or sparse feature points, but is not limited thereto.

In an embodiment, the processor 104 may provide an arrangement suggestion associated with the actual environment based on the tracking performance evaluation result for the virtual environment. For example, in response to determining that the tracking performance of the first virtual environment area is the first state, the processor 104 may correspondingly suggest adding furnishings and/or decorations in the corresponding first actual environment area.

On the other hand, in response to determining that the tracking performance of the first virtual environment area is the second state, the processor 104 may correspondingly determine that furnishings and/or decorations do not need to be further added in the corresponding first actual environment area, and may suggest to arrange the first actual environment area according to the arrangement manner of the first virtual environment area, but is not limited thereto.

To sum up, the method of the embodiments of the invention may know whether the arrangement manner of the virtual environment can enable the tracking device to achieve a good tracking performance in the corresponding actual environment through simulation. Moreover, the method of the embodiments of the invention may also provide relevant arrangement suggestions when the tracking performances corresponding to certain virtual environment areas are not good.

From another point of view, before the actual environment is arranged in a certain way, the method of the embodiments of the invention may evaluate in a simulated manner whether the arrangement manner can enable the tracking device to achieve a good tracking performance therein. In this way, it is possible to avoid spending extra manpower and cost to adjust the arrangement manner due to a poor tracking performance after the arrangement of the actual environment is completed.

Although the invention has been disclosed above with the embodiments, the embodiments are not intended to limit the invention. Anyone with ordinary knowledge in the technical field may make some changes and modifications without departing from the spirit and scope of the invention. The scope of protection of the invention should be defined by the scope of the appended claims.

What is claimed is:

1. A tracking performance evaluation method, suitable for a host, comprising:
    establishing a virtual environment;
    obtaining a tracking result of a virtual tracking device executing a tracking function in the virtual environment;
    providing a tracking performance evaluation result for the virtual environment based on the tracking result, wherein the virtual environment comprises a first virtual environment area; and
    providing an arrangement suggestion associated with an actual environment corresponding to the virtual environment based on the tracking performance evaluation result for the virtual environment, comprising:
    suggesting to add furnishings in the first virtual environment area in response to determining that the tracking performance evaluation result indicates that a tracking performance of the first virtual environment area is a first state; and
    suggesting to arrange a first actual environment area in an actual environment according to an arrangement manner of the first virtual environment area in response to determining that the tracking performance evaluation result indicates that the tracking performance of the first virtual environment area is a second state.

2. The method according to claim 1, wherein the virtual tracking device comprises a virtual head-mounted display disposed in the virtual environment.

3. The method according to claim 1, wherein the tracking function comprises an inside out tracking function.

4. The method according to claim 1, wherein the virtual environment comprises a plurality of virtual environment areas, and the tracking result comprises a feature point state corresponding to each of the virtual environment areas.

5. The method according to claim 4, wherein the virtual environment areas comprise a first virtual environment area, the feature point state of each of the virtual environment areas comprises a feature point quantity, and the step of providing the tracking performance evaluation result for the virtual environment based on the tracking result comprises:
    determining that a tracking performance of the first virtual environment area is a first state in response to determining that the feature point quantity of the first virtual environment area is lower than a quantity threshold;
    determining that the tracking performance of the first virtual environment area is a second state in response to determining that the feature point quantity of the first virtual environment area is not lower than the quantity threshold.

6. The method according to claim 4, wherein the virtual environment areas comprise a first virtual environment area, the feature point state of each of the virtual environment areas comprises a feature point distribution, and the step of providing the tracking performance evaluation result for the virtual environment based on the tracking result comprises:
    determining that a tracking performance of the first virtual environment area is a first state in response to determining that the feature point distribution of the first virtual environment area does not satisfy a preset distribution condition;
    determining that the tracking performance of the first virtual environment area is a second state in response to determining that the feature point distribution of the first virtual environment area satisfies the preset distribution condition.

7. The method according to claim 6, further comprising:
    determining that the feature point distribution of the first virtual environment area satisfies the preset distribution condition in response to determining that the feature point distribution of the first virtual environment area indicates that a feature point density corresponding to the first virtual environment area is higher than a density threshold;
    determining that the feature point distribution of the first virtual environment area does not satisfy the preset distribution condition in response to determining that the feature point distribution of the first virtual environment area indicates that the feature point density corresponding to the first virtual environment area is not higher than the density threshold.

8. The method according to claim 1, wherein the step of establishing the virtual environment comprises:

obtaining a 3D model established by scanning the actual environment, and using the 3D model as the virtual environment.

9. The method according to claim 8, wherein the virtual environment is edited to have at least one of decorations and furnishings not present in the actual environment.

10. A host, comprising:
a storage circuit, storing a program code; and
a processor, coupled to the storage circuit and accessing the program code to execute:
establishing a virtual environment;
obtaining a tracking result of a virtual tracking device executing a tracking function in the virtual environment;
providing a tracking performance evaluation result for the virtual environment based on the tracking result, wherein the virtual environment comprises a first virtual environment area; and
providing an arrangement suggestion associated with an actual environment corresponding to the virtual environment based on the tracking performance evaluation result for the virtual environment, comprising:
suggesting to add furnishings in the first virtual environment area in response to determining that the tracking performance evaluation result indicates that a tracking performance of the first virtual environment area is a first state; and
suggesting to arrange a first actual environment area in an actual environment according to an arrangement manner of the first virtual environment area in response to determining that the tracking performance evaluation result indicates that the tracking performance of the first virtual environment area is a second state, wherein the actual environment corresponds to the virtual environment.

11. The host according to claim 10, wherein the virtual environment comprises a plurality of virtual environment areas, and the tracking result comprises a feature point state corresponding to each of the virtual environment areas.

12. The host according to claim 11, wherein the virtual environment areas comprise a first virtual environment area, the feature point state of each of the virtual environment areas comprises a feature point quantity, and the processor executes:
determining that a tracking performance of the first virtual environment area is a first state in response to determining that the feature point quantity of the first virtual environment area is lower than a quantity threshold;
determining that the tracking performance of the first virtual environment area is a second state in response to determining that the feature point quantity of the first virtual environment area is not lower than the quantity threshold.

13. The host according to claim 11, wherein the virtual environment areas comprise a first virtual environment area, the feature point state of each of the virtual environment areas comprises a feature point distribution, and the processor executes:
determining that a tracking performance of the first virtual environment area is a first state in response to determining that the feature point distribution of the first virtual environment area does not satisfy a preset distribution condition;
determining that the tracking performance of the first virtual environment area is a second state in response to determining that the feature point distribution of the first virtual environment area satisfies the preset distribution condition.

14. The host according to claim 13, wherein the processor further executes:
determining that the feature point distribution of the first virtual environment area satisfies the preset distribution condition in response to determining that the feature point distribution of the first virtual environment area indicates that a feature point density corresponding to the first virtual environment area is higher than a density threshold;
determining that the feature point distribution of the first virtual environment area does not satisfy the preset distribution condition in response to determining that the feature point distribution of the first virtual environment area indicates that the feature point density corresponding to the first virtual environment area is not higher than the density threshold.

15. The host according to claim 10, wherein the processor executes:
obtaining a 3D model established by scanning the actual environment, and using the 3D model as the virtual environment.

16. The host according to claim 15, wherein the virtual environment is edited to have at least one of decorations and furnishings not present in the actual environment.

* * * * *